UNITED STATES PATENT OFFICE.

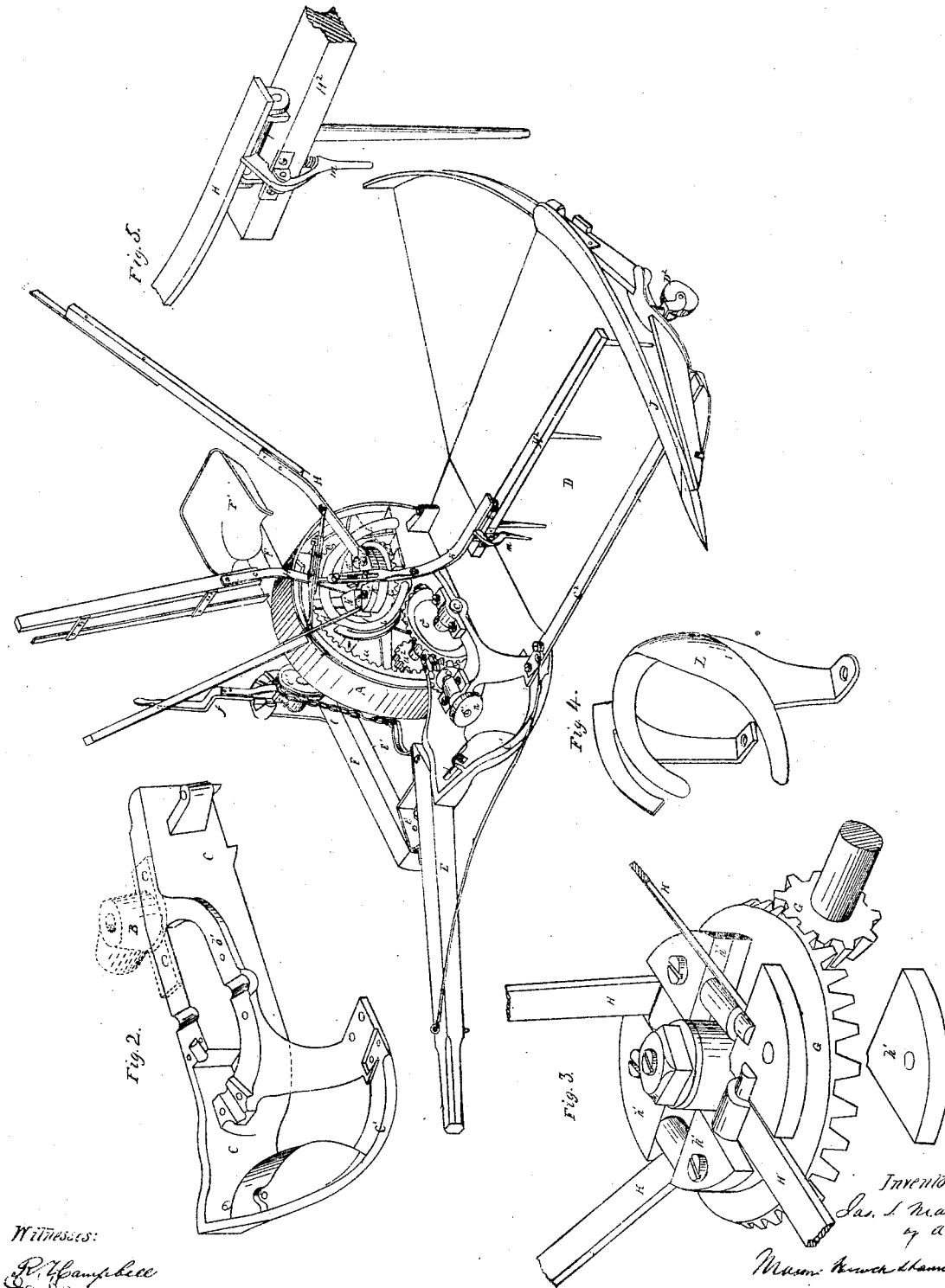
J. S. Marsh.
Harvester Rake.
Nº 58856     Patented Oct. 16, 1866.

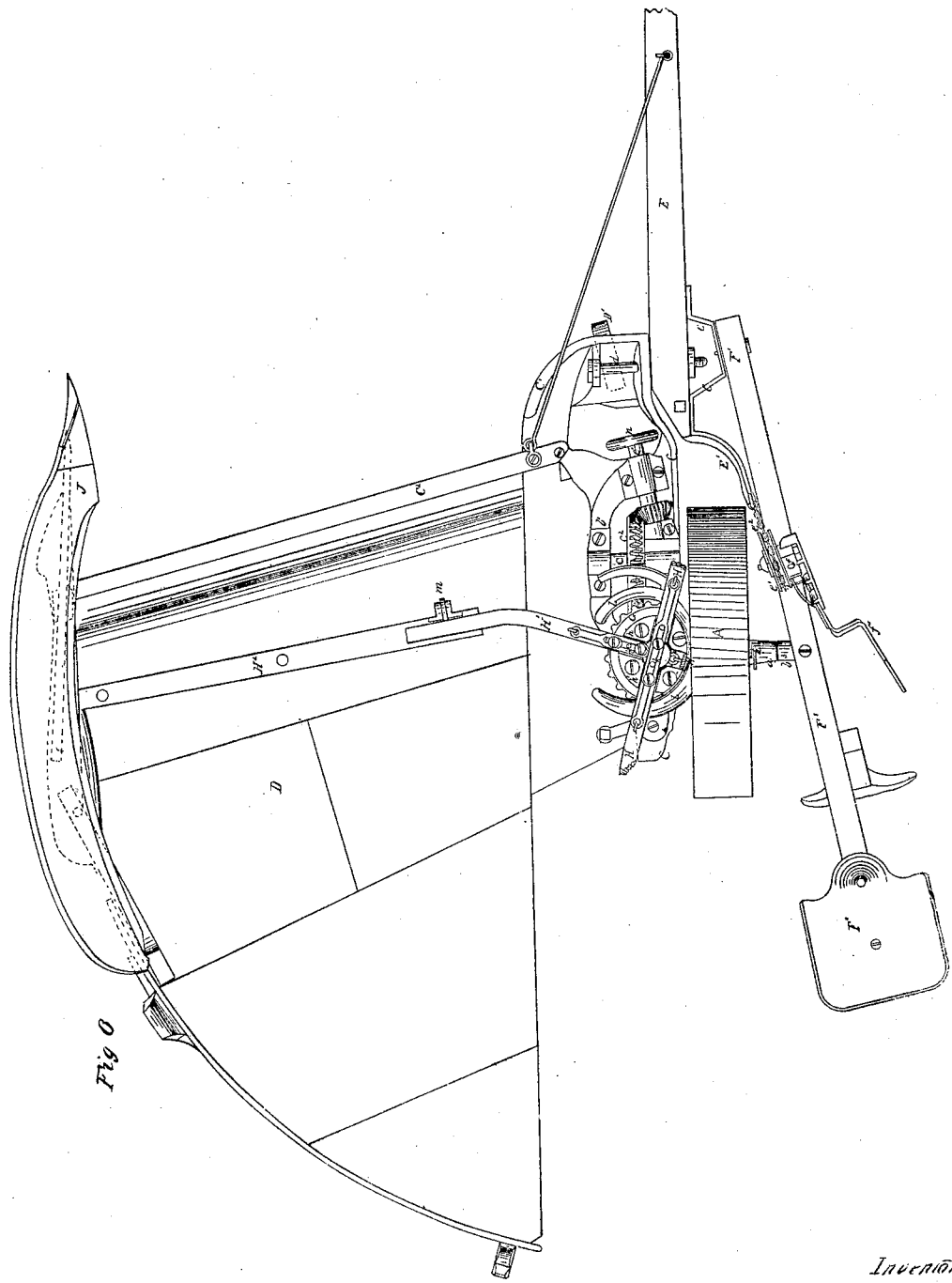

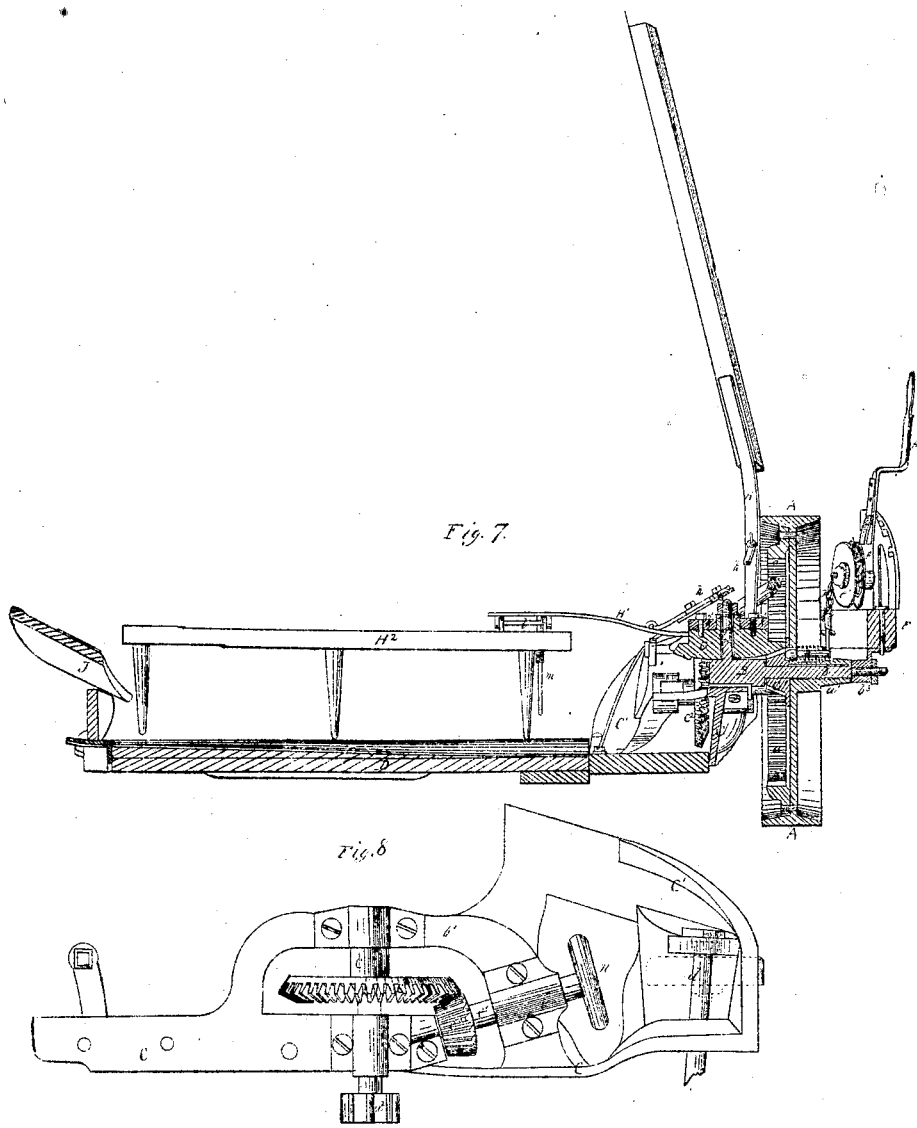

JAMES S. MARSH, OF LEWISBURG, PENNSYLVANIA.

IMPROVEMENT IN REAPING-MACHINES.

Specification forming part of Letters Patent No. 58,856, dated October 16, 1866.

*To all whom it may concern:*

Be it known that I, JAMES S. MARSH, of Lewisburg, in the county of Union and State of Pennsylvania, have invented a new and Improved Reaping-Machine; and I do hereby declare that the following is a full, clear, and exact description thereof, reference being had to the accompanying drawings, making a part of this specification, in which—

Figure 1, Sheet 1, is a perspective view of the reaper. Fig. 2 is a perspective view of the frame thereof. Fig. 3 is a perspective view of the crown-wheel, showing a mode of pivoting the rakes to it. Fig. 4 is a perspective view of the cam-guide rail for the rake and reel arms. Fig. 5 is a perspective view of the rake-head-adjusting device. Fig. 6, Sheet 2, is a plan view of the reaper. Fig. 7, Sheet 3, is a cross-section taken in a vertical plane through the center of the driving-wheel and rake attachment, and also through the platform. Fig. 8 is a top view of the metal frame of the reaper, showing the driving spur-wheels applied to it, the crown-wheel being detached.

Similar letters of reference indicate corresponding parts in the several figures.

This invention relates to a reaping-machine having a single driving-wheel and revolving rake and reel arms, which latter are arranged on the grain side of said wheel, so as to gather the standing grain up to the sickle, and at suitable times deliver it upon the ground from one side of the platform.

The object of my invention is to provide for gathering the grain well up to the cutting apparatus, at the inner end thereof, when a revolving rake and reeling attachment is used, which is located in rear of the outer shoe, and below the highest point of the driving-wheel, employing for said purpose a finger-bar which forms an obtuse angle with the draft-pole and is oblique to the line of draft, as will be hereinafter described.

Another object of my invention is to dispense with a wooden frame, as hitherto used for single-wheel reapers, and to locate the driver upon the rear end of a single beam, which is mounted upon the outer end of the axle, and connected at its forward end to the draft-pole in such manner that the driver, while sitting in his seat, can raise or lower the cutting apparatus and control the movements of a series of revolving rake and reel arms, which are located upon a bearing on the grain side of the driving-wheel, as will be hereinafter described.

The invention also has for its object the construction of a metal frame in such manner that it forms an outer shoe and guard, also bearings for the rake-gearing, and a cam-guide rail for the rake-arms; and it also affords means for sustaining the outer part of the platform, as will be hereinafter described.

To enable others skilled in the art to understand my invention, I will describe its construction and operation.

In the following description I shall designate that part of the reaper which is farthest from the standing grain as the "outer" part, and that part of the machine which is nearest the standing grain as the "inner" part or grain side.

In the accompanying drawings, A represents the driving and supporting wheel, which is constructed with an inside gear-wheel, $a$, and also with a long hub, $a^1$. This wheel is applied to a short shaft, $b$, which projects outward from a cast block, B, that is bolted on top of the frame C, as shown in Fig. 7, Sheet 3. The frame C is constructed with an exterior overhanging portion, $b^1$, which forms bearings for the outer ends of two short shafts, $c\ c^1$. The main portion of this frame forms bearings for the inner ends of these shafts, so that the two bevel-wheels $c^2\ c^3$ will come within the space formed by the curved portion $b^1$, as shown in Figs. 1, 6, and 8. This frame C projects forward a suitable distance, and has a curved shoe, $C^1$, formed on its front end, which shoe curves downward and backward, and unites with a standard that projects down from the front part of the portion $b^1$, as shown in Fig. 2. The frame C is adapted for receiving and having secured to it the finger-beam $C^2$ and the platform D. The curved shoe $C^1$ also forms a guard for preventing grain from being drawn over the frame C, and it also affords a means for receiving the standard of a small wheel, $D^1$, that may be used for elevating the front part of the machine over obstructions. The front end of the frame C is sufficiently elevated to admit of the attachment to it of the rear part of the draft-pole E by means of a transverse pivot-bolt, $d$, as shown in Figs. 1 and 6.

Upon the outer end of the short axle $b$ a collar, $b^3$, is applied loosely, and kept in place thereon by means of a nut, and to this collar $b^3$ a beam, F, is secured, which proceeds forward, and is pivoted at its front end to an arched plate, e, that is securely bolted to the draft-pole E, opposite the pivot-connection of this pole with the front end of the metal frame C.

The rear portion of the beam F extends backward and outward, and carries the driver's seat F', which can be adjusted backward or forward, according to the weight of the driver, for counterbalancing the weight of the forward part of the machine.

This beam F has a sector-standard erected on one side of it, forward of its support upon the axle of the main wheel A, to which standard a short transverse shaft is secured, and upon this shaft a pulley, $e^1$, is applied, to the hub of which a box, f, is secured, as shown in Fig. 1.

A hand-lever, f', which is pressed outward by a spring, is pivoted to the box f, and forced against the sector, from which latter a number of teeth project, that receive between them the hand-lever f'.

By pressing the lever f' inward, and thus freeing it from the teeth of the sector, the pulley $e^1$ can be oscillated forward or backward.

To the grooved pulley $e^1$ a chain, $e^2$, is attached, the lower end of which is again attached to the curved arm E', which forms a rear extension of the draft-pole E, so that the driver, while sitting in his seat F', can raise or lower the front end of the machine by moving lever f'.

The finger-bar $C^2$ is secured to the shoe $C^1$, so that its front edge forms, with the draft-pole E', an obtuse angle; or, in other words, this finger-bar is oblique to the line of draft, which brings its outer end forward of its inner end, as shown in Fig. 6. The caster-wheel $D^2$, which is applied at the inner end of the platform D, is used for supporting this end of the latter, so that it will not drag heavily over the stubble.

The outer supporting caster-wheel, $D^1$, may have its standard vertically adjustable, if desired.

The platform D is of the segment form, so as to allow of the delivery of the grain from its outer side in rear of the driving-wheel.

The bearing-block B, which is securely bolted on top of the metal frame C, and from which the axle of the driving-wheel A projects, has also another axis, g, projecting from its upper end, as shown in Fig. 7, Sheet 3, which is the axis about which a toothed crown-wheel, G, revolves. The teeth of this crown-wheel G engage with the teeth of a pinion spur-wheel, G', which is made fast to the driving-wheel A, as shown in Fig. 7. The driving-wheel A thus rotates the crown-wheel G continuously in one direction when the machine is moved forward.

The pinion spur-wheel G' is secured to the driving-wheel by means of a sliding spring-rod, h, (shown in Fig. 7,) so that when this rod is moved outward it will release the wheel G' and prevent it from being rotated with the driving-wheel A.

A short arm is applied to the outer end of the rod h, for the purpose of enabling the driver, while sitting in his seat F', to stop and start the motion of the crown-wheel at pleasure.

The crown-wheel G is constructed, as shown in Fig. 3, Sheet 1, with elevations upon it, forming four radial slots, in which the metal arms H $H^1$ of the rake and reel heads are pivoted, so that these heads and arms can vibrate freely in vertical planes.

In order to attach the arms to the elevations on the crown-wheel, half-bearings are formed at suitable points in the upper surfaces of the said elevations for receiving the pivots of the rake and reel arms, and these pivots are covered and held down in place by means of segment-caps h', which are bolted down upon the said elevations. This mode of applying the rake and reel arms is exceedingly simple, and will admit of the ready attachment or detachment of any one or all of the arms, at pleasure.

The crown-wheel is held down in place upon the block B by means of a nut, as shown in the drawings.

The rake and reel arms are connected together in pairs by means of extensible rods k, and they are guided and controlled in their rising and falling movements by means of a cam-rail, L, which is mounted above the crown-wheel G, and secured rigidly to the frame C, so as to nearly encompass this crown-wheel. This cam-rail is inclined inward or toward the platform D, and so shaped that as the rake and reel arms are revolved about the axis g by the crown-wheel the arms will be raised to an upright position in passing from the point at which the grain is delivered upon the ground to the point at which they descend into the standing grain.

In passing over the platform D the rake and reel arms move in a plane which is parallel to it, or nearly so.

By thus employing a rake-and-reel attachment which is so constructed and operated that the arms rise to a vertical (or nearly so) position while passing alongside of the drive-wheel, I am not only enabled to mount these arms upon the frame C below the highest point of this wheel, but I am also enabled to locate the driver's seat or position anywhere upon the beam F, so that the driver can raise or lower the front part of the cutting apparatus, stop or start the motion of the rake and reel arms, manage his team, and have perfect supervision over the entire machine while it is in operation.

When it is desired to have the rake perform two or more revolutions around the axis g without delivering the grain from the platform, I have provided for turning the rake-head, with its teeth, up out of the way of the grain which lies upon the platform, employing the rake-head in this case as a reel or gathering arm. The device for effecting this object is shown in Fig. 5, and consists in pivoting the rake-head $H^2$ to its rake-arm $H^1$ by means of a pin, $l$, and in employing a spring latch-arm, $m$, for holding the rake-head in place, both when the teeth are in an operative position and when they are moved out of such position. The driver, while sitting upon his seat F', can adjust the rake as he may desire when it moves around and rises to an upright position.

It will be seen that the rake and reel arms H $H^1$ are bent at an obtuse angle. This is done because the rake-support is located some distance in rear of the outer end of the finger-beam $C^2$, in order to have these arms gather in the grain uniformly, which they would not do if they all radiated from their axis of rotation; but with a finger-beam which is at right angles to the line of draft it is found that even the bending of the metal arms H $H^1$ will not allow the outer ends of the rake and reel arms to reach the standing grain which is within the angle formed by the divider J and the inner end of the finger-beam. To overcome this difficulty I arrange the finger-beam $C^2$ at such an angle with respect to the draft pole or frame C that the inner end of this finger-beam will be brought within the arc described by the inner end of the rake and reel arms, thus allowing these arms to gather in all the standing grain which is in front of the sickle.

The sickle, which is not shown in the drawings, receives a reciprocating motion from a crank-wheel, $n$, which is keyed on the front end of the shaft $c^1$, which is arranged upon frame C at right angles to the finger-beam, and which carries a pinion spur-wheel, $c^3$, that engages with a large spur-wheel, $c^2$, on the transverse shaft $c$. This shaft $c$ receives its motion from the inside gear-wheel, $a$, by means of a pinion spur-wheel, $a^2$. (Shown in Fig. 1.) The large bevel-wheel $c^2$ is connected to its shaft $c$, when the machine is moved forward, by a clutch, which releases this wheel and prevents it from turning when the machine is moved backward.

Having thus described my invention, what I claim as new, and desire to secure by Letters Patent, is—

1. Arranging a seat, F', upon a beam which is supported upon the outer end of the axle of the driving-wheel, to allow a person to ride and control the machine when a continuously-revolving combined rake and reel is mounted upon it, substantially as described.

2. The mode of attaching the seat-beam F to the draft-pole, in conjunction with a device which is applied to said beam for adjusting the height of cut, substantially as described.

3. The combination of a circularly-sweeping rake or reel with a finger-beam arranged substantially as described, so that the grain at the inner divider corner can be reached by the reel-arms.

4. The construction of the metal frame C with a shoe, $C^1$, substantially as described.

5. Adapting the metal frame C to support and serve as bearings for the spur-wheels $c^2 c^3$, and also for the rake and reel arms, substantially as described.

6. Arranging the gearing which gives motion to the sickle upon a frame which is located on the grain side of the driving-wheel, and in advance of the raking and reeling attachment, substantially as described.

JAMES S. MARSH.

Witnesses:
R. H. LAIRAX,
PETER BEAVER,
CHAS. C. SHORKLEY.